United States Patent [19]

Kammerl et al.

[11] Patent Number: 5,335,568
[45] Date of Patent: Aug. 9, 1994

[54] CONTROL FOR A MOTOR VEHICLE DRIVE HAVING AN AUTOMATIC TRANSMISSION

[75] Inventors: August Kammerl, Brunn; Friedrich Graf, Regensburg, both of Fed. Rep. of Germany

[73] Assignee: Siemens Aktiengesellschaft, Munich, Fed. Rep. of Germany

[21] Appl. No.: 937,548

[22] Filed: Aug. 28, 1992

[30] Foreign Application Priority Data

Aug. 30, 1991 [EP] European Pat. Off. ........ 91114629.8

[51] Int. Cl.$^5$ .............................................. B60K 41/06
[52] U.S. Cl. ................................... 477/109; 364/424.1
[58] Field of Search ......................... 74/866; 364/424.1

[56] References Cited

U.S. PATENT DOCUMENTS

| | | |
|---|---|---|
| 4,228,700 | 10/1980 | Espenschied et al. ............... 74/866 |
| 4,403,527 | 9/1983 | Mohl et al. |
| 4,594,666 | 6/1986 | Cornell ............................. 364/424.1 |
| 4,648,040 | 3/1987 | Cornell et al. ..................... 364/424.1 |
| 4,663,714 | 5/1987 | Cornell et al. ..................... 364/424.1 |
| 4,945,481 | 7/1990 | Iwatsuki et al. |
| 4,968,999 | 11/1990 | Fodale et al. |
| 5,029,087 | 7/1991 | Cowan et al. ..................... 364/424.1 |

FOREIGN PATENT DOCUMENTS 0323257 7/1989 European Pat. Off.
2151727 7/1985 United Kingdom.

Primary Examiner—Leslie A. Braun
Assistant Examiner—Daniel Wittels
Attorney, Agent, or Firm—Herbert L. Lerner; Laurence A. Greenberg

[57] ABSTRACT

A motor vehicle drive has an engine and an automatic transmission. A control for the motor vehicle drive includes an engine control for controlling a variable influencing torque of the engine and a transmission control for controlling shifting events of the transmission and for transmitting an intervention signal initiating a shifting event to the engine control. The transmission control includes a first device for ascertaining a current transmission input torque, a memory for storing torque values being maximally allowable during a shifting event, as a function of engine rpm and shifting type, a second device for comparing the current transmission input torque with the maximum allowable torque value at any given time and ascertaining a proportion by which the engine torque is to be varied during the shifting event, and a pulse former circuit for converting the proportion into a pulse modulated signal to be transmitted to the engine control as a control signal for controlling a variation in the engine torque during the shifting event.

5 Claims, 3 Drawing Sheets

CONTROL FOR A MOTOR VEHICLE DRIVE HAVING AN AUTOMATIC TRANSMISSION

BACKGROUND OF THE INVENTION

Field of the Invention

The invention relates to a control for a motor vehicle drive having an automatic transmission, including an engine control with which a variable that influences the torque of the engine is controlled, and a transmission control with which shifting events of the transmission are controlled and with which an intervention signal for initiating a shifting event is transmitted to the engine control.

Such a control for a motor vehicle drive with an automatic transmission must control the transmission in such a way that shifting proceeds comfortably and in particular without jerking or jolting. Wear of the friction elements, namely clutches and brakes, in the transmission should also be kept as low as possible. To that end, slipping or scraping times must not exceed a predetermined duration. For that purpose, an intervention into the engine control is made during shifting, in order to vary and in most cases reduce the torque.

The engine control in a control system known from German Patent DE 29 35 916 C2, corresponding to U.S. Pat. No. 4,403,527, includes a plurality of performance graphs, and the intervention signal forwarded from the transmission control to the engine control is merely a switchover signal, by means of which a shift from a first to a second performance graph is made. The second performance graph effects reduced values for the engine torque for various operating states of the engine, for instance in order to damp the increase in moment from the engagement of a free-running clutch in the automatic transmission and thus to reduce the jerking upon shifting or the wear of slipping or scraping friction elements in the transmission. The reduced engine torque values must be ascertained by the transmission manufacturer through costly experimentation. Other variables influencing the reduction of engine torque cannot be taken into account.

It is accordingly an object of the invention to provide a control for a motor vehicle drive having an automatic transmission, which overcomes the hereinafore-mentioned disadvantages of the heretofore-known devices of this general type, which enables comfortable and low-wear shifting and which takes other variables influencing the shifting process into account.

SUMMARY OF THE INVENTION

With the foregoing and other objects in view there is provided, in accordance with the invention, in a motor vehicle drive having an engine and an automatic transmission, a control for the motor vehicle drive, comprising an engine control for controlling a variable influencing torque of the engine; and a transmission control for controlling shifting events of the transmission and for transmitting an intervention signal initiating a shifting event to the engine control, the transmission control including a first device for ascertaining a current transmission input torque, a memory for storing torque values being maximally allowable during a shifting event, as a function of engine rpm and shifting type, a second device connected to the first device and to the memory for comparing the current transmission input torque with the maximum allowable torque value at any given time and ascertaining a proportion by which the engine torque is to be varied during the shifting event, and a pulse former circuit connected to the second device and to the engine control for converting the proportion into a pulse modulated signal to be transmitted to the engine control as a control signal for controlling a variation in the engine torque during the shifting event.

In accordance with another feature of the invention, the control signal has an amplitude including information regarding a proportion by which the engine torque is varied, and the control signal has a length including information regarding a duration of a variation in the engine torque.

In accordance with a further feature of the invention, the control signal is transmitted in the form of a pulse width modulated signal.

In accordance with an added feature of the invention, the control signal is transmitted as a digitally encoded signal.

In accordance with a concomitant feature of the invention, the second device has a linking member with a protective function, for forwarding the larger of two signals as the torque variation proportion.

Other features which are considered as characteristic for the invention are set forth in the appended claims.

Although the invention is illustrated and described herein as embodied in a control for a motor vehicle drive having an automatic transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
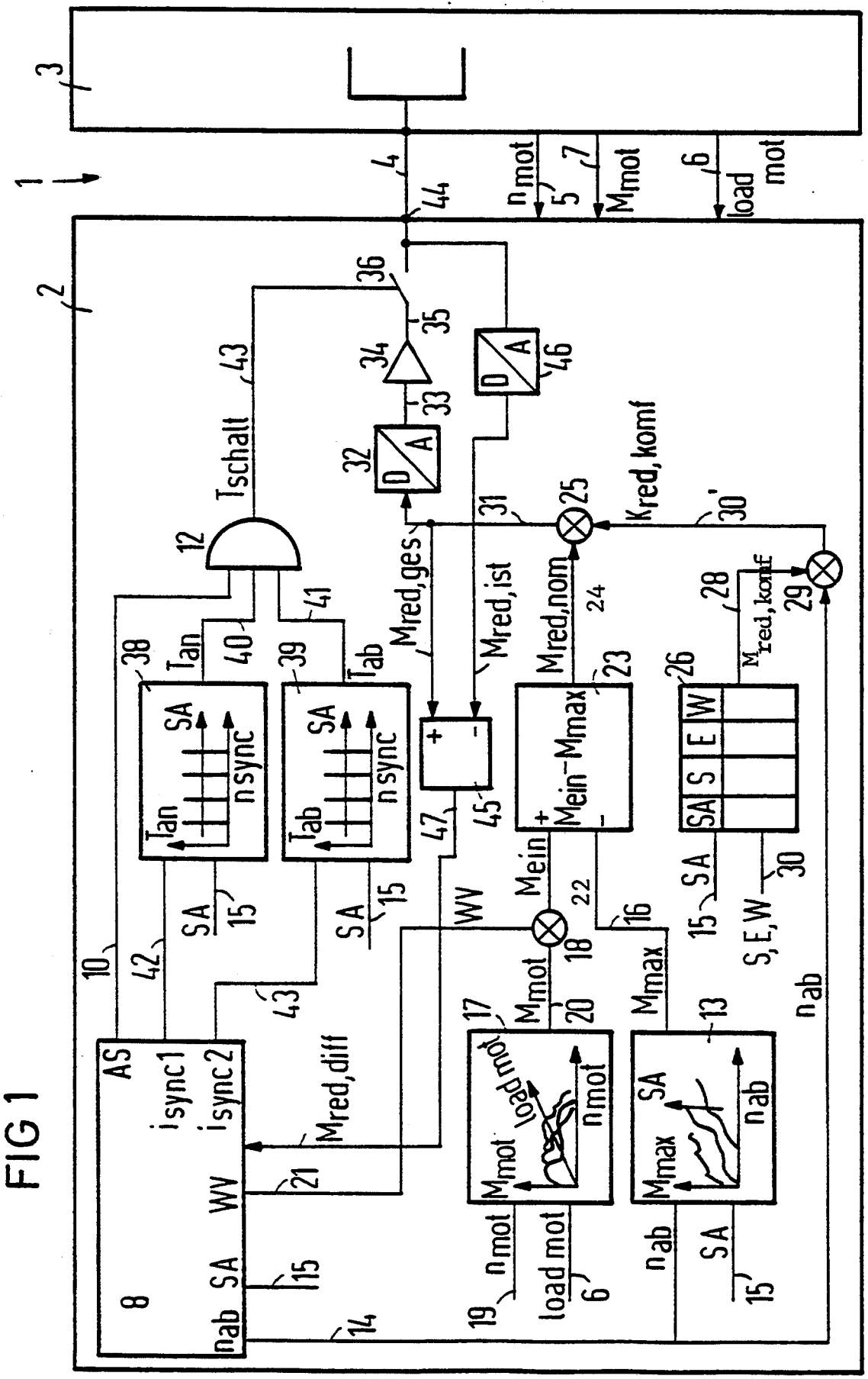
FIG. 1 is a schematic and block circuit diagram of a control according to the invention.

Referring now to the figures of the drawing in detail and first, particularly, to FIG. 1 thereof, there is seen a control 1 for a non-illustrated motor vehicle drive which includes a transmission control 2 and an engine control 3, that are connected to one another by signal lines 4, 5, 6 and optionally 7.

The transmission control 2 has a conventional circuit part 8, which carries out functions of conventional transmission controls in a known manner. Additionally, it also includes circuit parts that will be described below. An activation signal AS is generated in the circuit part 8 and is transmitted over a line 10 to an AND element 12. This signal indicates a forthcoming shifting event and serves to prepare an associated engine intervention.

A control signal to be explained below is transmitted from the transmission control 2 to the engine control 3 over the line 4. An engine rpm $n_{mot}$ is transmitted from the engine control 3 to the transmission control 2 over the line 5. Information regarding the engine torque $M_{mot}$ can also be forwarded from the engine control 3 to the transmission control 2 over the line 7. Finally, information regarding the engine load $load_{mot}$ reaches the transmission control 2 from the engine control 3 over the line 6.

In order to provide a further explanation of the operation of the control system 1, reference is made to the following functional dependency of an rpm-dependent engine torque $M_{red,ges}$, which is lessened or reduced during a shifting event, by various influencing variables, as requested from the engine control 3 by the transmission control 2:

$$M_{red,ges}(n_{in}/n_{out}) = f(M_{red,nom}*, M_{red,komf}, n_{in}*i_x/n_{out}, SA)$$

In this equation, the symbols have the following meanings:

Reference symbol $M_{ein}$ is a transmission speed torque, which is calculated from $$M_{ein} = WV \cdot M_{mot}$$

in which a converter amplification WV in the transmission control 2 is known, and the engine torque $M_{mot}$ is ascertained either from the engine control 3 or from the transmission control 2 itself.

Reference symbol $i_x$ is the ratio of the transmission in the gear or speed x.

An equation $n_{in} * i_x/n_{out} = i_{sync}$ is the ratio of the input rpm of the transmission, multiplied by the gear ratio and divided by the transmission output rpm. This quotient represents the actual force lock of the transmission, and in steady-state driving operation it has the value of 1. A force-locking connection is one which connects two elements together by force external to the elements, as opposed to a form-locking connection which is provided by the shapes of the elements themselves.

Reference symbol $M_{red,nom}$ is the nominal value of the torque reduction during shifting, which is determined by the allowable energy loss in the shifting elements during the shifting. This value is formed by subtraction of a maximum allowable transmission input torque $M_{max}$ in the shifting event from the instantaneous transmission input torque $M_{ein}$, which in turn depends on a type of shifting SA and on the transmission power takeoff rpm $n_{ab}$.

Reference symbol $M_{red,komf}$ is a moment reduction value characterizing the shifting comfort, which is formed from the shifting type SA and the driving program, multiplied by the transmission power takeoff rpm.

A performance graph memory 13 receives the transmission power takeoff rpm $n_{ab}$ from the circuit part 8 over a line 14, and over a line 15 it receives the signal SA, which indicates the type of shifting, that is whether it is upshifting or downshifting and whether it is a shift under load or a load-free shift. The maximum allowable transmission input torque $M_{max}$ during shifting is stored in the performance graph memory 13 as a function of $n_{ab}$ and SA. The value $M_{max}$ is applied to a first input of a comparator or subtraction element 23 over a line 16.

An engine performance graph 17 receives the engine rpm $n_{mot}$ over a signal line 19 and it receives the engine load $load_{mot}$ over a signal line 6. An engine output torque $M_{mot}$ that is stored in memory as a function of these parameters is applied over a signal line 20 to a multiplier 18. There, it is multiplied by the converter amplification WV, which is ascertained by the circuit part 8 and transmitted over a line 21. The product of this multiplication is the transmission input torque $M_{ein}$, which is applied over a line 22 to a second input of the comparator 23. In the comparator 23, the nominal value of the torque reduction $M_{red,nom}$ is formed, which is dependent on the maximum allowable transmission input torque and is fed to an OR element 25 over a signal line 24.

In a memory 26, so-called shifting comfort values are stored, which depend on the type of shifting SA and on shifting program signals S (for "sporty"), E (for "economy") and W (for "winter mode"). These shifting program signals are received over a line 30 and the shifting type is received over a line 15. The shifting comfort factor $M_{red,komf}$, which is dependent on the shifting program signals, passes from the output of the memory 26 over a signal line 28 to a multiplier 29, where it is multiplied by the transmission power takeoff rpm $n_{ab}$. This produces a modified shifting comfort value $K_{red,komf}^*$, which reaches the OR element 25 over a signal line 30'. In the OR element, that value is linked with the nominal torque reduction $M_{red,nom}$, from which the actual value for the torque reduction $M_{red,ges}$ effected during the shifting event is obtained. The linking is carried out in such a way that the larger value of the two signals $M_{red,nom}$ and $M_{red,komf}$ at a given time is sent over a line 31. This kind of linking acts as a protective function for the transmission. The value is converted in a digital/analog converter 32 into an analog signal, which passes through a line 33, an amplifier 34 and a line 35, to reach a switch 36. If the switch 36 is closed, the value is output to the engine control 3 over the line 4.

However, the value $M_{red,ges}$ can also be forwarded to the engine control 3 through a PWM modulator as a pulse width modulated signal, or through a serial interface as a digitally encoded signal.

Respective signals $T_{an}$ and $T_{ab}$, which define the onset and the end of the engine intervention, are output from two memories 38 and 39 over lines 40 and 41. The memories 38 and 39 receive input signals in the form of the signals SA for the type of shifting which arrive over the line 15, and two rpm synchronizing quotients $i_{sync\, x}$ (where x=1, 2), which travel from the circuit part 8 over respective signals lines 42 and 43 to reach the inputs of the applicable memory 38 or 39. The digital signals $T_{an}$ and $T_{ab}$ reach the AND element 12, in which a shifting time signal $T_{schalt}$ is generated, which controls the switch 36 over a signal line 43.

As soon as a certain ratio $i_{sync\, 1}$ of the input rpm to the output rpm in an previously selected gear, that is an intended gear from which shifting is to begin, has been reached, the force lock in the transmission is interrupted enough so that some of the friction elements slip and the engine races. Once the specified value for this quotient has been reached, a logical "1" appears at the output of the memory 38.

If a predetermined value of the rpm synchronizing quotient $i_{sync\, 2}$ is attained in the new gear, that is the gear to which shifting is planned to be done, then the transmission control detects that the friction elements are no longer slipping or scraping and that as a result the transmission can again transmit torque, in the new gear. Once this predetermined quotient value is attained, a logical "zero" appears at the output of the memory 39.

Characteristic curves or values for the switchover points $i_{sync\,1}$ and $i_{sync\,2}$ are stored in the memories 38 and 39 for each shifting type. The activation signal AS, which is also known as an arming signal, and is generated by the circuit part 8, is logically linked in the AND element with the signals $T_{an}$ and $T_{ab}$ and the result is the shifting time signal or shifting signal $T_{schalt}$, which reaches the switch 36 over the line 43 and defines the onset and end of the applicable engine intervention.

It is thus seen that the transmission control 2 includes a first device having elements 8, 17, 18 for ascertaining a current transmission input torque $M_{ein}$, a memory 13 for storing a maximum allowable torque value $M_{max}$, a second device having elements 23, 25, 26 for comparing the current transmission input torque $M_{ein}$ with the maximum allowable torque value $M_{max}$ and ascertaining a proportion $M_{red,ges}$, and a pulse former circuit having elements 32, 34, 36 for converting the proportion $M_{red,ges}$ into a pulse modulated signal to be transmitted to the engine control 3.

Figure 2:
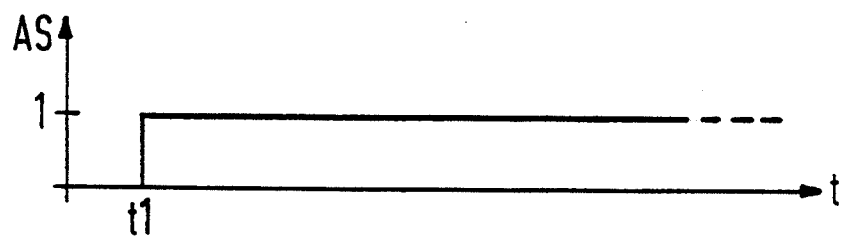
FIGS. 2–7 are graphs showing the course over time of various signals transmitted in the control of FIG. 1.
Figure 3:
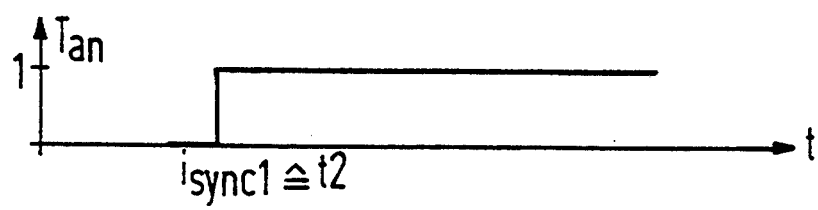
Figure 4:
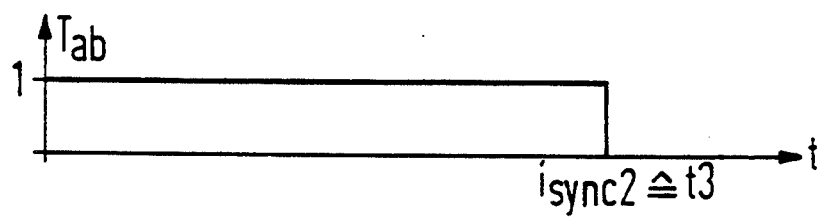
Figure 5:
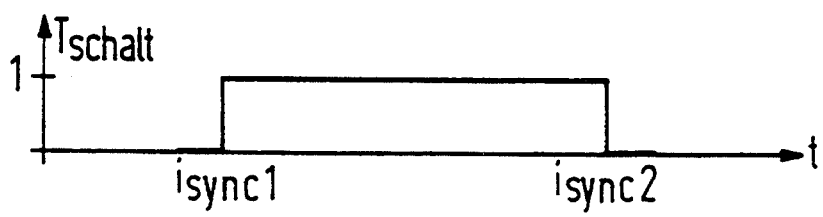

In FIGS. 2-7, the above-explained signals are shown in the form of logical signal levels having the values "0" and "1" as a function of time t. FIG. 2 shows the activation signal AS that is transmitted over the line 10, which at a time t1 jumps to the value of "1". FIGS. 3, 4 and 5 show the signals $T_{an}$, $T_{ab}$ and $T_{schalt}$ as a function of time. In the case of the special times shown in these diagrams, the following relationship regularly applies:

$$t1 = \text{onset of shifting}$$

$$t2 = \frac{n_{in} \cdot i_1}{n_{out}} \cdot f(SA)$$

$$t3 = \frac{n_{in} \cdot i_2}{n_{out}} \cdot f(SA)$$

Figure 6:
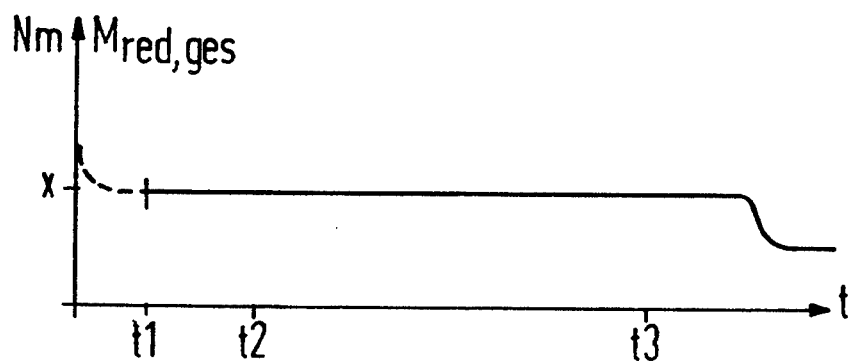

FIG. 6 is a highly simplified illustration of the actual value of the torque reduction and $M_{red,ges}$ as it is obtained, for instance, at the output of a non-illustrated sample and hold element. Between times t1 and t3, the torque reduction assumes a fixed value x (expressed in Nm, for example).

Figure 7:
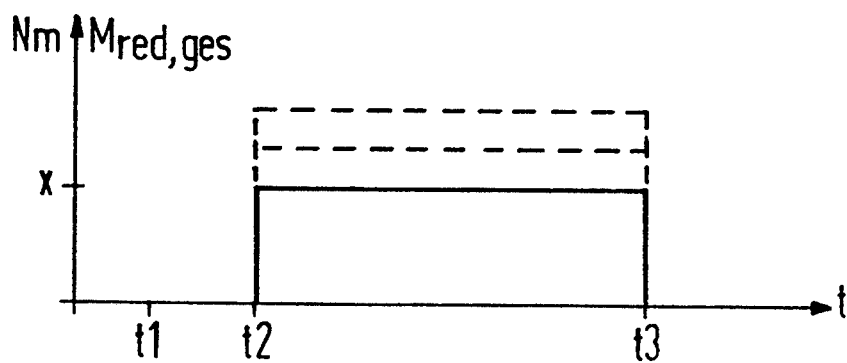

Finally, FIG. 7 shows the digital value $M_{red,ges}$ in the form in which it is output at an output 44 of the transmission control 2 and reaches the engine control 3 over the line 4. The period of time t3−t2 corresponds to the duration of moment reduction for the shifting event.

Figure 8:
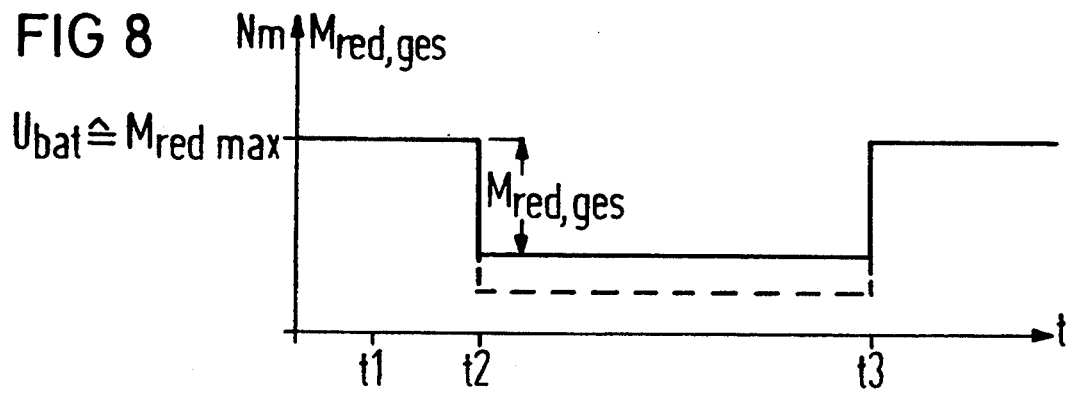
FIG. 8 is a graph showing a further example of a control signal.

Instead of the above-described logic levels, the circuit can also be made with inverted logic levels. The resultant inverted course of the actual torque reduction is shown in FIG. 8.

If the engine control 3, for various reasons, is unable to perform the engine intervention with the scope demanded by the transmission control 2, then the engine control 3 varies the signal $T_{schalt}$ that is output on the line 4 by the transmission control 2. One reason may be that the engine control 3 has knocking control means, which is active at the time. Since the knocking control variable is also the ignition angle, the engine control cannot perform the engine intervention as demanded by the transmission control.

It is therefore advantageous for the transmission control 2 to define this deviation by means of a digital comparator 45, which is preceded by an A/D converter 46. The comparator 45 applies an output signal $M_{red,diff}$ ($M_{red,ges} - M_{red,ist}$) over a line 47 to the circuit part 8, if the signal on the line 4 has been modified by the engine control 3. The transmission control 2 can then perform an adaptation, in such a manner that the coupling pressure is corrected, for instance, or shifting is discontinued, or shifting points are relocated to ranges with a lesser tendency toward knocking.

We claim:

1. In a motor vehicle drive having an engine producing torque and an automatic transmission, a control for the motor vehicle drive, comprising:
   an engine control for controlling a variable influencing the torque of the engine; and
   a transmission control for controlling shifting events of the transmission, said transmission control having means for generating and for transmitting an intervention signal to the engine control for initiating a shifting event, said transmission control including:
   a first device for ascertaining a current transmission input torque,
   a memory for storing torque values being maximally allowable during a shifting event, as a function of engine rpm and shifting type,
   a second device connected to said first device and to said memory for comparing the current transmission input torque with the maximum allowable torque value at any given time and ascertaining a proportion by which the engine torque is to be varied during the shifting event, and
   a pulse former circuit connected to said second device and to said engine control for converting the proportion into a pulse modulated signal to be transmitted to said engine control as a control signal for controlling a variation in the engine torque during the shifting event.

2. The control according to claim 1, wherein the control signal has an amplitude including information regarding a proportion by which the engine torque is varied, and the control signal has a length including information regarding a duration of a variation in the engine torque.

3. The control according to claim 1, wherein the control signal is transmitted in the form of a pulse width modulated signal.

4. The control according to claim 1, wherein the control signal is transmitted as a digitally encoded signal.

5. The control according to claim 1, wherein said second device has a linking member with a protective function, for forwarding the larger of two signals as the torque variation proportion.

* * * * *